Jan. 25, 1949. H. T. AVERY 2,459,862
TEN KEY ENTRY MECHANISM
Original Filed Oct. 16, 1943 8 Sheets-Sheet 1
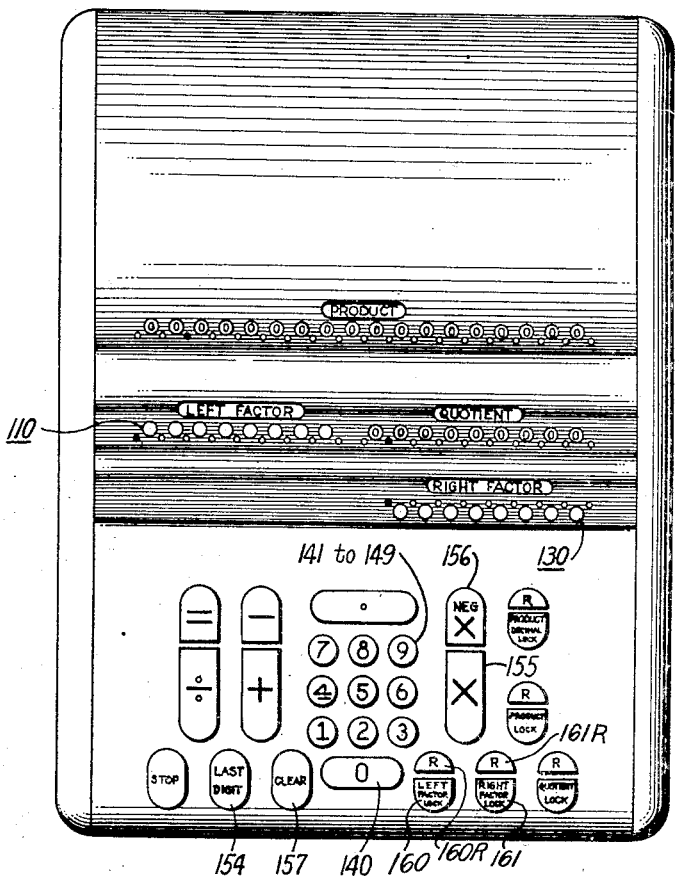
FIG_1_
INVENTOR
*Harold T. Avery*
BY
*Naylor and Lassagne*
ATTORNEYS

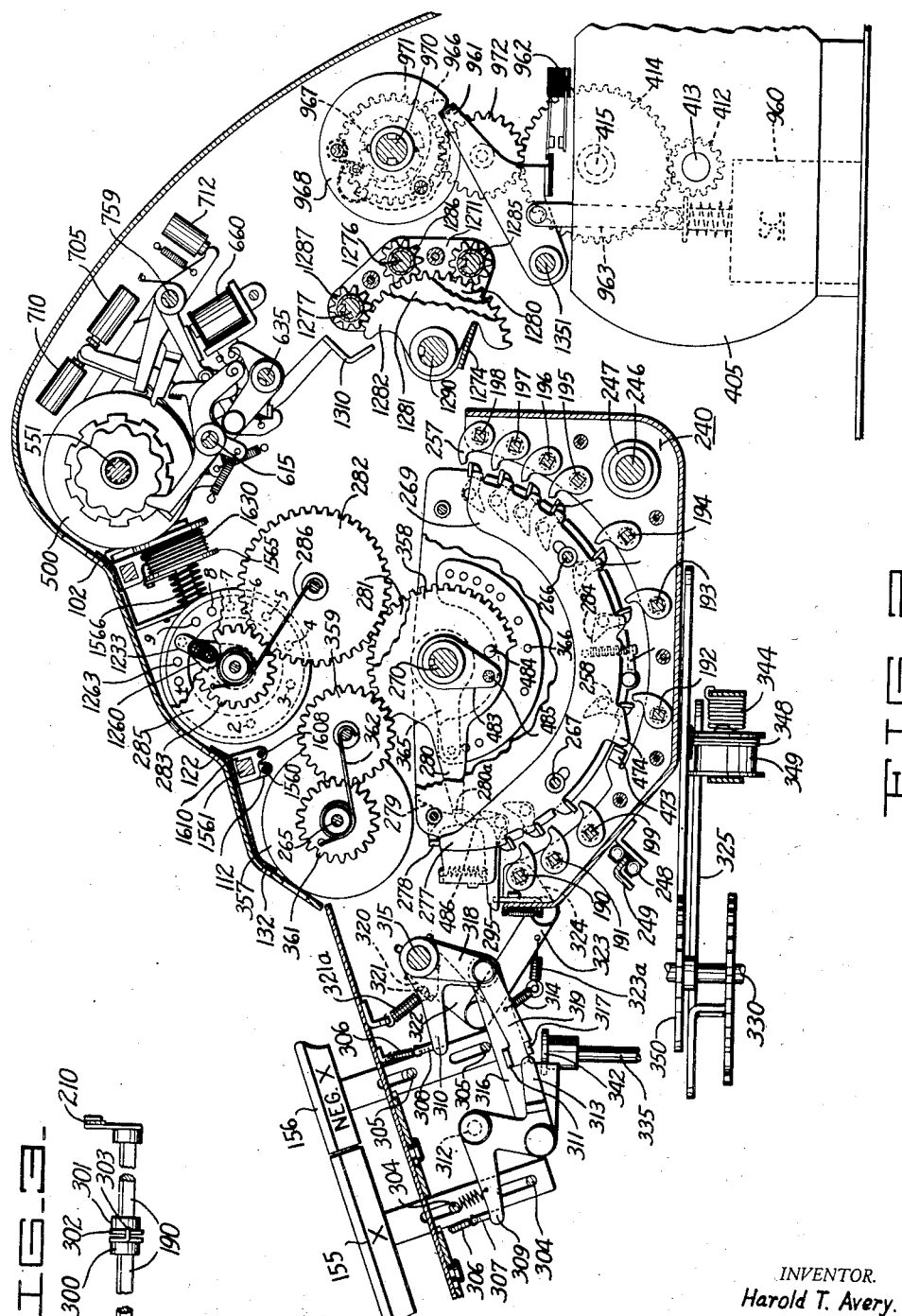

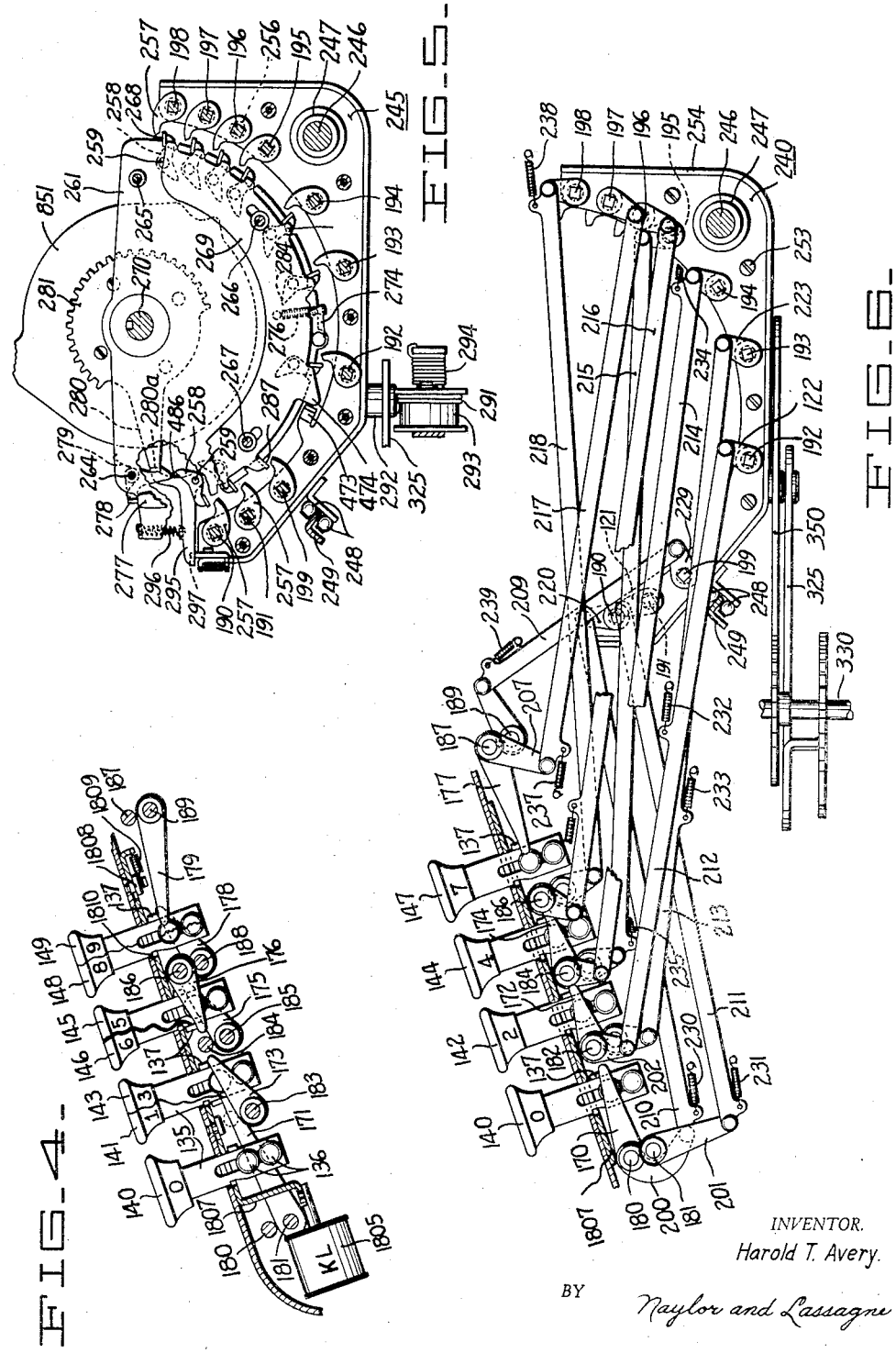

Jan. 25, 1949.  H. T. AVERY  2,459,862
TEN KEY ENTRY MECHANISM
Original Filed Oct. 16, 1943  8 Sheets-Sheet 4
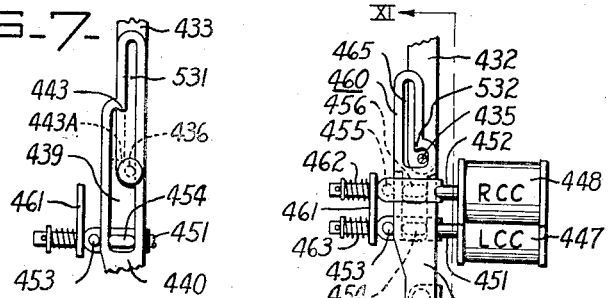
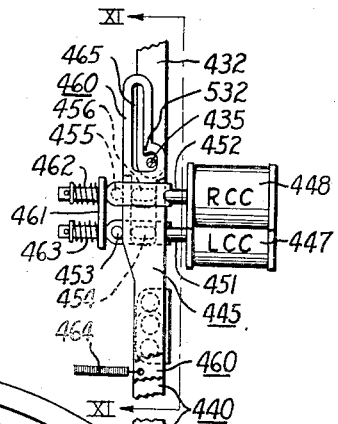
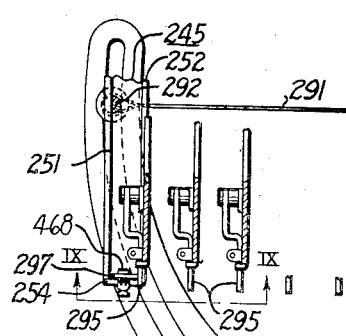
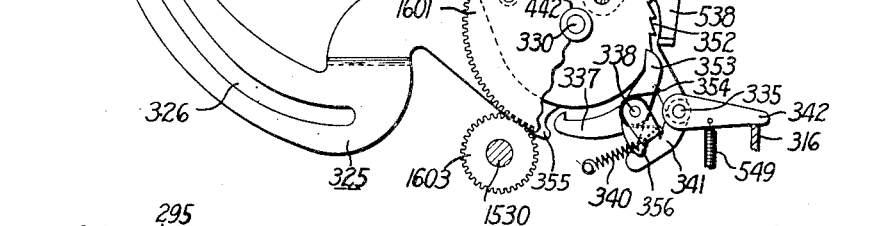
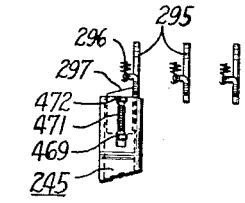
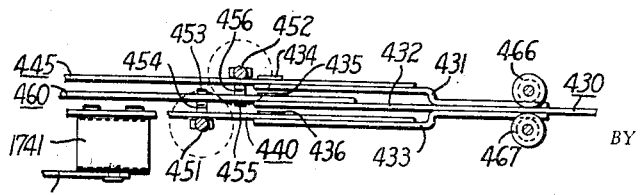
INVENTOR.
Harold T. Avery.
BY Naylor and Lassagne
ATTORNEYS.

Jan. 25, 1949. H. T. AVERY 2,459,862
TEN KEY ENTRY MECHANISM
Original Filed Oct. 16, 1943 8 Sheets-Sheet 5
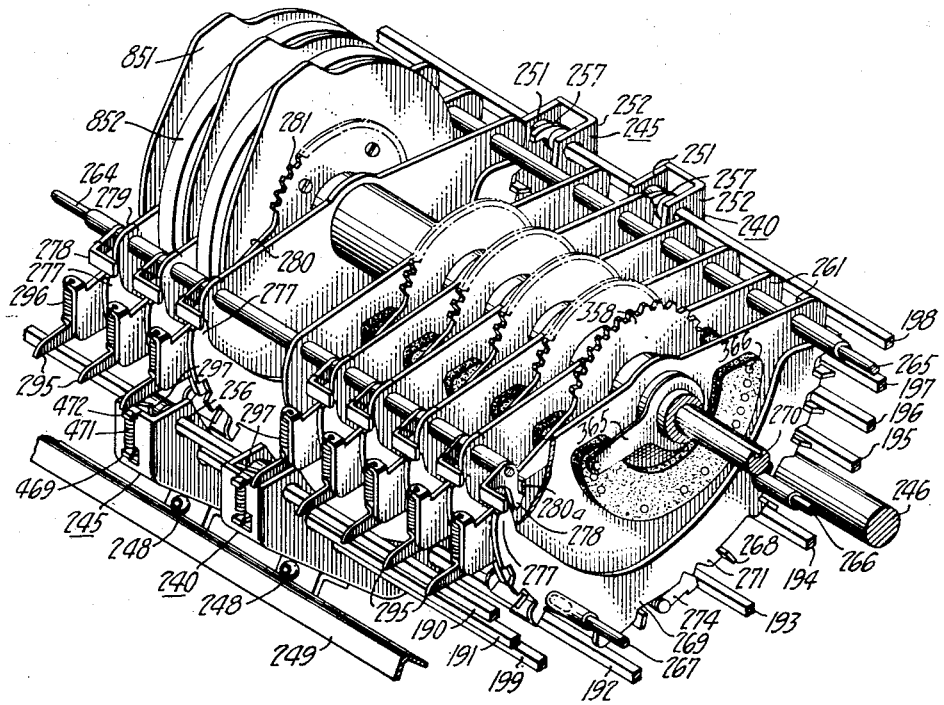
FIG_12_
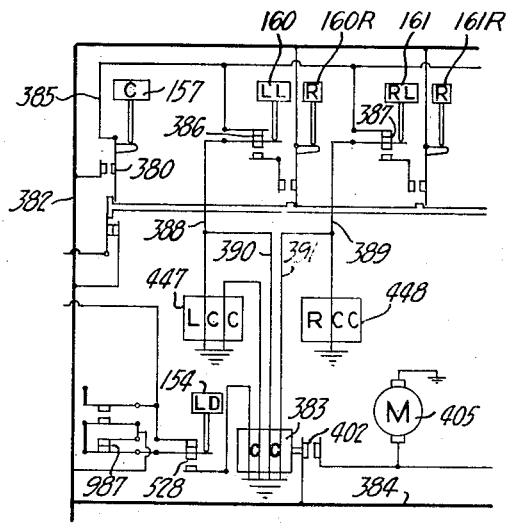
FIG_13_
INVENTOR
Harold T. Avery
BY Naylor and Lassagne
ATTORNEYS Jan. 25, 1949.                H. T. AVERY                2,459,862
                        TEN KEY ENTRY MECHANISM
Original Filed Oct. 16, 1943                        8 Sheets-Sheet 6

INVENTOR.
Harold T. Avery.
BY
Naylor and Lassagne
ATTORNEYS.

Jan. 25, 1949.  H. T. AVERY  2,459,862
TEN KEY ENTRY MECHANISM
Original Filed Oct. 16, 1943  8 Sheets-Sheet 7
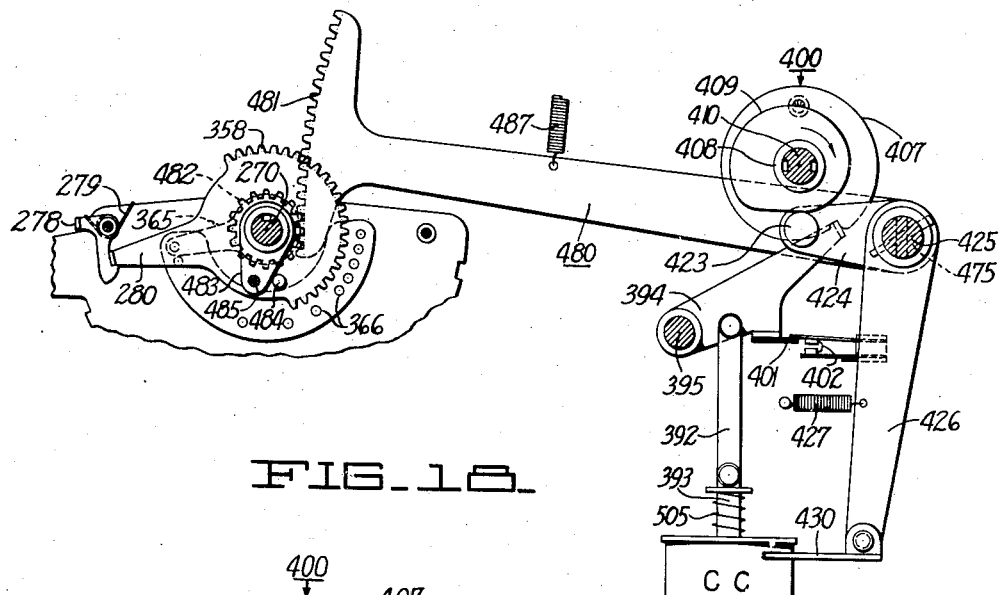
FIG_18_
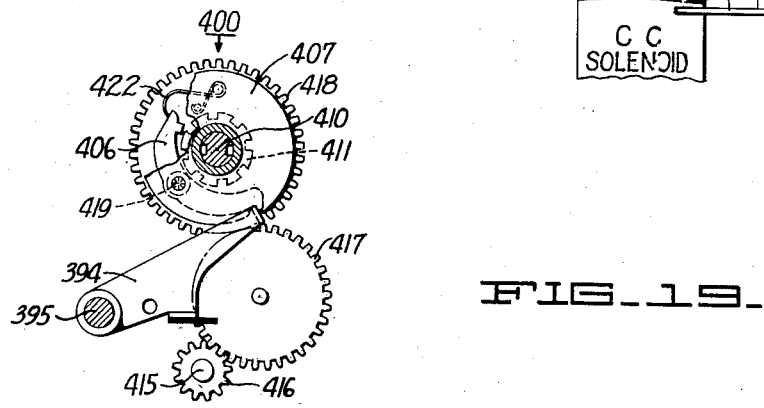
FIG_19_
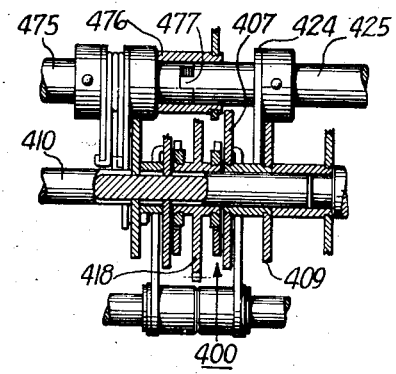
FIG_20_
INVENTOR
Harold T. Avery
BY Naylor and Lassagne
ATTORNEYS Jan. 25, 1949.  H. T. AVERY  2,459,862
TEN KEY ENTRY MECHANISM
Original Filed Oct. 16, 1943  8 Sheets-Sheet 8
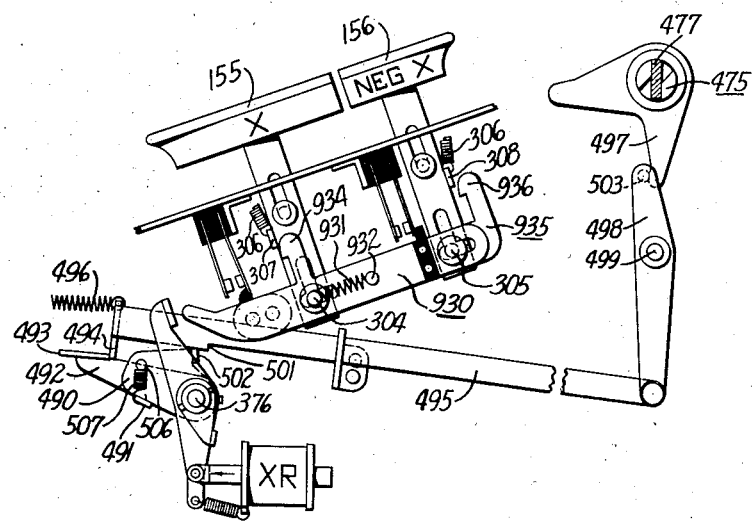
FIG_21_
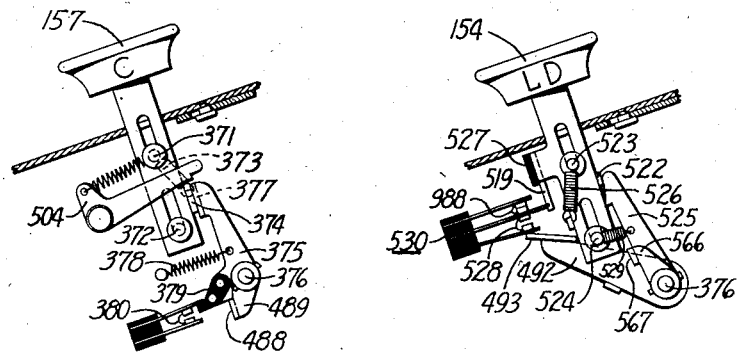
FIG_22_  FIG_23_
INVENTOR
Harold T. Avery
BY Naylor and Lassagne
ATTORNEYS Patented Jan. 25, 1949

2,459,862

UNITED STATES PATENT OFFICE 2,459,862

TEN KEY ENTRY MECHANISM

Harold T. Avery, Oakland, Calif., assignor to Marchant Calculating Machine Company, a corporation of California Original application October 16, 1943, Serial No. 506,519. Divided and this application March 7, 1945, Serial No. 581,514

16 Claims. (Cl. 235—61)

1

The present invention relates to calculating machines and more particularly to key set-up mechanisms therefor which are of the ten-key type.

Key set-up mechanisms have heretofore been of two distinctly different types, each having its advantages and disadvantages. One of these two types is known as the full or multiple column keyboard type which has a plurality of columns of keys, each column having nine or ten keys numbered zero or one to nine, inclusive. This type has the advantage of enabling the operator to set up a multidigit factor in any selected column of keys so that the factor so set up may be properly located with respect to a second factor and/or to the result register, but has the disadvantage of making it necessary for the operator to select the particular column in which each digit is to be set, which is time consuming and conducive to errors in placing the factor digits in their proper ordinal positions.

The second type of key set-up mechanism is known as the ten-key type which has the advantage of enabling the operator to set up successive digits of a factor by means of the touch system without having to constantly look at the keyboard, but has the disadvantages of making it necessary in certain calculations to set up zeros before or after the significant digits of the factor in order to properly position the factor with respect to the accumulator register.

The machine embodying the present invention has the advantages of both of these types and the disadvantages of neither, and is so arranged that the factors may be set up rapidly on a ten-key keyboard, and by means of an automatic positioning mechanism, the factors so set up are accurately positioned in proper decimal relation to the accumulator register. This automatic positioning mechanism is disclosed and claimed in the Avery application Serial Number 506,519, filed October 16, 1943, of which this is a division; the invention claimed in the present case being that pertaining to the ten-key set-up and control mechanism per se. These two cases are so closely related that reference to the parent case is suggested to acquire understanding of the full advantages of the mechanism shown in the present divisional case.

Various modifications of ten-key set-up mechanisms have been devised whereby two factors of a calculation may be set in two separate factor receiving devices by the same ten-key keyboard. These mechanisms have heretofore included a single set-up carriage which is shifted step by step with respect to one factor receiving device for setting up the successive digits of one factor, then moved through all unset orders of the first factor receiving device and into operative relationship with the second factor receiving device.

2

The time required for such shifting may cause an appreciable delay in the operation of the machine and prove troublesome as well as time consuming in case of rapid set-up.

The present invention makes it possible to switch control of the ten-key keyboard from one factor receiving device to the other without such delay, this being accomplished by providing two separate and independently operable set-up carriages which may be simultaneously shifted out of and into controlling relationship with their respective factor receiving devices.

Aside from such advantages as this novel arrangement may have within itself, it attains special utility when used in combination with decimal and shift control mechanism such as that disclosed in the above mentioned parent case, whereby each of the set-up carriages may exert its own independent control over the decimal and shift mechanism, with the result that the various factors of a calculation can be automatically entered into the machine in their proper decimal relation as more fully described in said parent case.

One of the principal objects of the invention therefore is the improvement of factor selection mechanisms for calculating machines.

It is a further object of the invention to enable one of two set-up carriages and to disable the other, so that the ten-key keyboard is effective to enter a selected factor into only one factor receiving device at a time.

It is a further object of the invention to utilize the depression of a calculation control key to enable one set-up carriage and to disable the other.

It is a further object of the invention to normalize both set-up carriages upon operation of the mechanism for zeroizing the factor receiving devices, such normalizing preferably comprising the restoring of one set-up carriage to an initial effective position and the restoring of the other carriage to an ineffective position.

It is a further object of the invention to initiate operation of a normalizing mechanism which is common to both factor receiving devices and both set up carriages, and to automatically enable said normalizing mechanism, under certain conditions, to zeroize the factor numeral wheel which was last set up in either receiving device and to shift the corresponding set-up carriage into controlling relationship with said numeral wheel without changing the position of the other set-up carriage.

It is a further object to zeroize one or more numeral wheels upon a single key depression, the number of wheels zeroized being determined by the length of time that the key is held depressed.

Other objects will appear during the following detailed description of a preferred form of the invention, reference being made to the accompanying drawings forming a part of this specification in which:

Figure 1 is a top exterior view of the machine showing particularly the ten-key keyboard, the control keys and the factor numeral wheels;

Figure 2 is a longitudinal section as viewed from the right side of the machine, showing the general arrangement of the machine and particularly the selection and control mechanism therefor;

Figure 3 is a detailed view of the zero selection shaft;

Figure 4 is a detailed view of the numeral keys;

Figure 5 is a longitudinal section as viewed from the right side of the machine, illustrating the left factor selection mechanism and the shiftable set-up carriage therefor;

Figure 6 is a right side view of certain of the numeral keys showing their connection to the numeral selecting shaft;

Figure 7 is a fragmentary view showing the details of certain of the clearing mechanisms shown in Figure 8;

Figure 8 is a plan view of the set-up carriage shift controlling mechanism and part of the factor clearing mechanism. In this view, the rear of the machine is at the top of the figure.

Figure 9 is a front view of the ordinal shift blocking levers for the left factor set up carriage, the view being taken as indicated by the arrows IX—IX in Figure 8;

Figure 10 is a detailed view of a part shown less clearly in Figure 8;

Figure 11 is a sectional view taken on the line XI—XI in Figure 8;

Figure 12 is a perspective view taken from the forward upper right hand side of the machine showing the left and right factor selection mechanisms, the left and right factor set-up carriages, and their relation to each other and to their associated selection mechanisms;

Figure 13 is a wiring diagram for the clearance and last digit mechanism;

Figure 18 is a right side view of the clear clutch control mechanism and the mechanism actuated by the clear clutch for normalizing the selection mechanism;

Figure 19 is a right side view of the clear clutch showing the details of the construction thereof;

Figure 20 is a sectional plan view of the clear clutch mechanism shown also in Figure 18. In this view, the top of the figure is at the rear of the machine.

Figure 21 is a right side view of the "X" and "Neg. X" key, and the mechanism driven by the clear clutch for releasing these and certain other control keys;

Figure 22 is a right side view of the clear key and associated mechanism;

Figure 23 is a right side view of the last digit key and associated mechanism.

Figure 14:
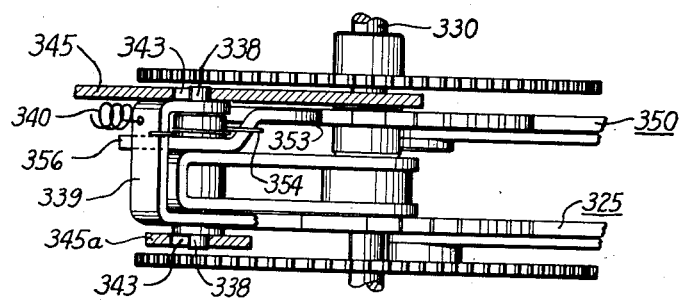
Figures 14 and 15 are enlarged detail views, taken from the right, of the set-up carriage shift controlling mechanism shown in Figure 8.

The numeral keyboard mentioned hereinbefore effects entry of values into the factor numeral wheels by means of a shiftable set-up carriage mechanism, which moves ordinally step by step into operative relation with successive numeral wheels. There is one set-up carriage for each factor indicator 110 and 130 (Fig. 1), and each carriage is adapted to assume either a full step or half step position. When a carriage is in its full step position it is rendered effective to determine the setting of the numeral wheel with which it is aligned, and when it is in its half step position it is rendered ineffective to control the setting of any numeral wheel. The carriages are so related that when the first of the two carriages, for example, is shifted into its full step position, the second carriage is retained in a half step position so that depression of a selected numeral key effects entry of the digit corresponding to the numeral delineated thereon, into only that numeral wheel with which the first carriage is aligned. Depression of a control key, such as the "X" key 155, then is adapted to escape the first carriage into its half step position and to release the second carriage for movement into its full step position, so that subsequent depressions of the numeral keys then effect entry of digits into the factor indicator associated with the second carriage.

Factor selection switches are positioned concurrently with the rotation of the factor numeral wheels and are adapted to condition certain selection circuits explained hereinafter, in accordance with the position to which the numeral wheels are rotated.

The reference numerals shown in the drawings but not referred to in the following detailed description of the machine correspond to those in the copending application Serial Number 506,519 of which this is a division.

Keyboard

The numeral keys 140 to 149 (Figs. 1, 4 and 6), representing the numeral values "0" to "9," respectively, are mounted on key stems 135 which are slidable on stationary studs 136. Each key stem has an ear 137 which overlies a respective one of a group of levers 170 to 179 and is adapted, upon depression thereof, to rock one of the respective shafts 180 to 189 (Figs. 4 and 6). These shafts terminate at the right side of the machine and are connected to their respective selection shafts 190 to 199 by means of the link and lever connections, such as lever 200 secured to the end of shaft 180, and connected by link 210 to lever 220 fixed to the zero shaft 190. Likewise, shaft 181 is connected to shaft 191, shaft 182 to shaft 192, et cetera. Depression of the respective numeral keys 140 to 149 thus rock the respective shafts 190 to 199 counter-clockwise through a small angle, there being springs 230 to 239 (Fig. 6) for returning the keys, shafts, and links to the position shown after the keys are released. Any well known prior art interlocking mechanism could be provided, if desired, to prevent depression of two keys simultaneously or to prevent depression of a second key when one is down. In the present mechanism, however, it is possible to depress two keys simultaneously, as in certain commercial calculating machines, but no misoperation will result therefrom since the lower numbered key always controls.

Set-up carriages

As described briefly hereinbefore, there is a left factor and right factor set-up carriage, each of which is controlled by the numeral keyboard and effects entry of selected digits into the left and right factor numeral wheels respectively. These two carriages are identical, the right factor carriage 240 being shown in Figs. 2 and 6, the left factor carriage 245 being shown in Figure 5, and both carriages being shown in Figure 12. They are mounted and maintained upright on a common stationary shaft 246 by bushings 247 and have two rollers 248 which are rotatably mounted on studs integral with the factor carriage and are guided by a stationary supporting member 249. Each carriage is composed of a flat plate 251 (Figure 12) and a flanged plate, or angle 252, which are held together by screws, such as screw 253 (Figure 6), and spaced by suitable spacers to form a U-shaped section having the web 254 on the outer side. Clearance holes 256 (Figure 12) are provided in the carriage for the selection shafts 190 to 199 so the carriage may be shifted transversely without the shafts binding.

Mounted on the selection shafts between the plates of each carriage are levers 257 which are fitted to and therefore rock with the shafts, and at the same time are slidable thereon, with the carriage, as it shifts from order to order during the set-up operation. The levers 257 are operatively associated with a plurality of blocking levers 258 (Figures 2 and 5) which are freely pivoted on studs 259 mounted on the stationary brace plates 261. There is one such brace plate in each denominational order and these plates are held in place by tie bolts or shafts 264 to 267, inclusive, (Figure 5) and are spaced by suitable spacers.

Movement of any lever 257 and its associated lever 258 releases the selecting arm 280 in the order with which the active set up carriage is currently associated so as to effect rotation of the related numeral wheel and position the selection switching mechanism. Each selecting lever 258 has an ear 268 which, in addition to being engaged by its associated lever 257, extends across the plane of an arcuate plate 269 which is slidable on shafts 266 and 267, one such arcuate plate 269 being located adjacent to each of the brace plates 261. Lugs 271 are located on the plate 269 in front of the ears 268 so that clockwise rocking of any one of the levers 258 slides plate 269 clockwise about the central shaft 270. A pawl 274 is pivotally mounted on each stationary plate 261 and is pressed into one or the other of the two notches in its respective plate 269 by a spring 276, so as to retain the latter plate in either of its two positions.

The upper forward end of each plate 269 terminates in a nose 277, as shown in Figure 12, which nose is adapted to rock a latch 278 (Figure 5) clockwise about the stationary shaft 264 against the pressure of a torsion spring 279. A hook on the latch 278 normally underlies a laterally extended ear 280a of the arm 280 and prevents counter-clockwise movement of the arm, but when the latch is rocked clockwise as described above, the hook is removed from beneath the ear 280a and releases the arm 280. A gear segment 281 is integral with the arm 280 which is freely pivoted on shaft 270. There is one such arm and gear segment in each denominational order of the left factor indicator and each is geared to its associated numeral wheel by gears such as 282 and 283 (Fig. 2). The arrangement is therefor such that depression of a selected key, for example the number "3" key, rocks shaft 193 (Figs. 5 and 6) counter-clockwise. The lever 257 mounted on this shaft in the left factor set up carriage in turn rocks the nose 284 (Fig. 5) of its associated lever 258 upwardly into the path of ear 280a so that when the arm 280 is released by latch 278, a torsion spring 286 (Fig. 2) drives gears 283, 282, and 281, and rotates arm 280 counter-clockwise until the ear 280a is blocked by the nose 284 of the "3" blocking lever 258. The levers 258 are located around the center of shaft 270 in such positions as to limit the rotation of the arm 280 and its associated numeral wheel 285 by amounts indicative of the numeral keys depressed. The number 9 shaft 199 is out of its natural position, however, and is so located as to shorten the number 9 connecting link 209 (Fig. 6). It will be noted further that the number 9 lever 257 (Fig. 5) has no lever 258 associated with it, but instead engages an ear 287 formed directly on the plate 269 for tripping latch 278. The arm 280 in the case of a nine selection is blocked in its extreme counter-clockwise position by a shaft 265 (Fig. 5).

*Set-up carriage shifting mechanism*

After a digit is entered into a selected numeral wheel the carriage is shifted toward the right one step to a position where the levers 257 mounted in the carriage are aligned with the levers 258 associated with the next numeral wheel to the right. A flexible cable 291 (Figs. 5 and 8) is attached to a stud 292 mounted on the left factor carriage 245 while the other end is wound around a spool 293 (Fig. 5). A spring 294 tends to rotate the spool and thus pull the carriage toward the right (Fig. 8). Rightward movement is normally blocked by one of a series of levers 295, there being one such lever in each order mounted on the same stationary stud 259 which supports the zero blocking lever 258 (Fig. 5). A spring 296 tends to rock lever 295 clockwise, but this movement is prevented by the ear 280a of arm 280. When the arm is released by latch 278 and moves downwardly the spring 296 is then free to rock the stop lever 295 clockwise and out of the path of a lug 297 slidably mounted on the carriage, as shown in Figs. 9 and 12, and described more in detail hereinafter. The carriage is then free to move toward the right under urge of the spring driven cable until the lug strikes the next stop lever 295 (Figs. 8 and 12). The set up of another digit in the next order again releases the carriage and so on after each digital value is set up.

The same keyboard effects entry of digital values into the right factor indicator 130 (Fig. 1) as well. In multiplication, the operator depresses the "X" key 155, or the "Neg. X" key 156 after entry of the multiplicand factor into the left factor indicator, and the above "X" keys release the left factor set-up carriage, effect the blocking thereof in a half step inoperative position, and escape the right factor set-up carriage from its half step position into its operative full step position.

Taking these operations in the above order, the "X" key 155 or "Neg. X" key 156 (Fig. 2) is adapted to rock the zero selecting shaft 190 so as to release the left factor carriage. This shaft is divided, as shown in Fig. 3, and has hubs 300 and 301 integral with the left and right sections of the shaft, respectively. A flange integral with the hub 301 has a nose 302 which overlies a lateral extension 303 on the flange of hub 300, so that the left half of the shaft, which controls only the left factor set-up may be rocked counter-clockwise (as viewed in Fig. 2) by the "X" or "Neg. X" keys without rocking the right half associated with the right factor indicator, but when the right half of the shaft is rocked by the linkage from the zero numeral key, the nose 302 depresses the lateral extension 303 and rocks the left half of the shaft. This arrangement is provided to enable the "X" keys to release the left factor carriage without releasing the right factor carriage, and at the same time to enable the zero numeral key to rock both parts of the shaft for controlling entry of a zero in either the left or right factor indicator.

The "X" keys 155 and 156 (Fig. 2) are mounted for up and down movement on studs 304 and 305 and are normally maintained in raised position by springs 306. The keys also have ears 307 and 308, respectively, which are adapted to rock two bell cranks 309 and 310 counterclockwise about a stud 312 and a shaft 315, respectively, on which they are freely pivoted. A link 316 connects the two bell cranks and is moved toward the right when either key is depressed. A lever 318 is fixed to the shaft 315 and has a link 319 pivoted thereto which is urged downwardly by a spring 314. An ear 317 is formed on link 316 and lies adjacent a shoulder of lever 319 so that rightward movement of the link rocks lever 318 and shaft 315 counterclockwise. A second lever 320 is fixed to the shaft 315 and has an ear 321 which is formed across the plane of a lever 322 which lever is freely mounted on shaft 315. A link 323 connects lever 322 with a lever 324 fixed to the left half of the zero shaft 190. The zero lever 257 carried by the left factor carriage (but not the corresponding lever carried by the right factor carriage) is therefore rocked counterclockwise with the shaft 190, in response to the depression of the "X" or "Neg. X" key and sets a zero in the numeral wheel immediately to the right of the last left factor numeral wheel set up, and thereby escapes the left factor set-up carriage in the manner described hereinbefore.

The "X" and "Neg. X" keys are latched down for the duration of multiplication by means described later, and at the same time, the shaft 315 must be returned to its initial position for reasons also described in the aforementioned Avery patent application, therefore, a tripping mechanism is provided to disconnect the "X" and "Neg. X" keys from the above linkage. An arm 313 (Fig. 2) is provided on the bell crank 309 and underlies an ear 311 formed on the link 319, so that during the last part of the depression of the "X" keys, after the zero shaft has been rocked far enough to effect escapement of the left factor set-up carriage, the arm 313 engages the ear 311 and raises the shoulder of link 319 above ear 317. A spring 321a and a second spring 323a are then free to return the shaft 315 and the left half of the zero shaft 190 to their initial positions, respectively.

When the left factor carriage is released by the "X" or "Neg. X" key, as described above, the stud 292 (Fig. 8) mounted thereon moves toward the right. An arm 325, pivoted on a vertical shaft 330, has a slot 326 in which the stud slides, the shape of this slot being such that equal linear steps of the carriage effect equal angular steps of the arm. Therefore, by blocking the arm 325 in a half step position, the carriage may be prevented from moving into its next operative full step position, and this is accomplished by operation of the following mechanism.

Figures 16, 17:
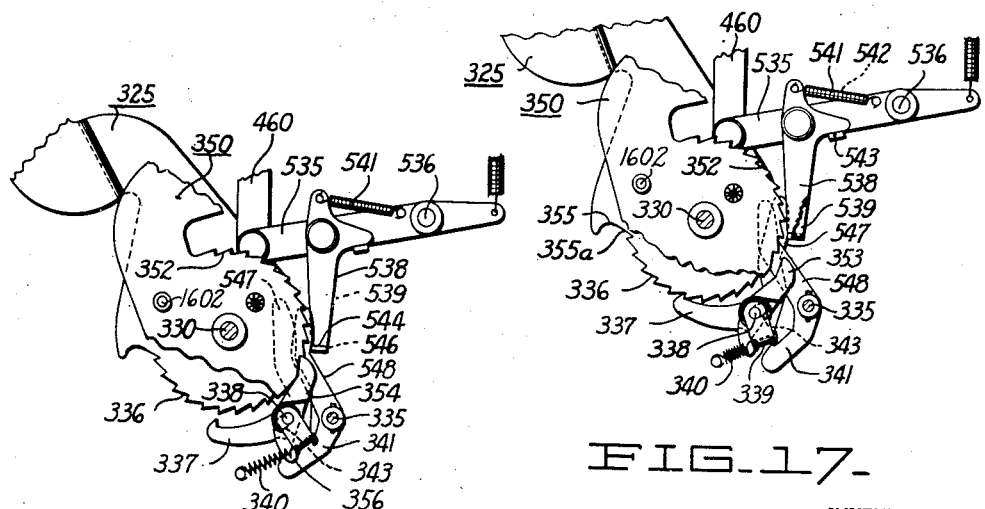
Figure 16 is a detailed view of certain parts of Figure 8, the parts being shown in the position they assume during the set up of the left factor.
Figure 17 is a detailed view of the same part shown in Figure 16, the parts being shown in the position they assume during the set up of the right factor.

The arm 325 is shown in Fig. 16 in the position six steps from the initial position shown in Fig. 8, for example, as if five multiplicand digits had been set up and the carriage had been shifted ready to receive the sixth digit. It will be noted that there are a series of ratchet teeth 336 on a segment of the arm 325 and a pawl 337 adapted to move about a stud 338 into engagement with any one of the teeth. This pawl is formed into a bail, as shown in Figs. 10 and 14, and has a web 339, to which a spring 340 is attached to urge the pawl in a clockwise direction. A latch 341 (Fig. 16) is secured to a shaft 335 and normally retains the pawl 337 in the position shown in Fig. 16 against the tension of spring 340, but when the "X" or "Neg. X" key 155 or 156 is depressed (Fig. 2) the latch is rocked counterclockwise in the following manner to release pawl 337. The link 316 (Fig. 2), in moving toward the right (or rearwardly in the machine) rocks a lever 342 (Fig. 8) counterclockwise against the tension of a spring 549 and thereby rocks the shaft 335 to which lever 342 and latch 341 are fixed. This counter-clockwise rocking of shaft 335 removes the hook of latch 341 (Fig. 16) from in front of the web 339, whereupon the spring 340 is free to rock the pawl 337 into engagement with a ratchet tooth 336 as shown in Fig. 17.

Stud 338, on which pawl 337 is pivoted, is journaled in two elongated holes 343 in stationary frame plates 345 and 345a (Fig. 14). These holes 343 are indicated by the broken lines 343 (Fig. 16) from which it can be seen that the stud is normally held in the right end of the holes by latch 341, but when released from restraint of this latch it is moved into the left end thereof as shown in Fig. 17, by the combined pull of spring 340 and the ratchet teeth 339 of arm 325. The length of the elongated holes is such that when the stud moves from the right to the left end thereof, the arm 325 and the left factor set-up carriage 245 (Fig. 8) are permitted to advance, but are limited to half a step where they remain until the machine is cleared.

So far in this description it has been assumed that a five digit multiplicand has been entered into the left factor indicator, the "X" key has been depressed, and the left factor carriage has moved into its half step or inoperative position. Next, the right factor carriage must be rendered operative so as to effect entry of multiplier digits into the right factor indicator.

The right factor carriage has a stud 347 (Fig. 8) to which is connected a flexible cable 348 urged toward the right by a second spring urged spool 349 (Fig. 2) around which the cable is wound in a manner described in connection with the left factor carriage. The right factor carriage arm 350 has a slot 351 (Fig. 8) having the same function as slot 326, and also has a series of teeth 352 which cooperate with a second pawl 353. This pawl is freely mounted on stud 338 and is urged counter-clockwise into engagement with the teeth by a torsion spring 354. An arm 356 of pawl 353 lies behind the web 339 so that when the spring 340 rocks pawl 337 and its integral web 339 clockwise to the position shown in Fig. 17 the pawl 353 is rocked out of engagement with the right factor ratchet 352 and releases the arm 350 and the right factor set-up carriage, which is then blocked in its first full step operative position by the first one of the series of stops 295 (Fig. 2) in exactly the same way described in connection with the left factor set-up carriage.

The right factor set-up carriage 246 (Fig. 2) also has a series of levers 257, each being adapted upon actuation to rock into blocking position a selected one of the blocking levers 258 in the current active order of the right factor indicator 130, thereby setting the arm 280 in said order. The arm 280 in each order transmits its movement to its associated numeral wheel 357 by means of the segment 358, gears 359, and 361, there being a spring 362 connected to gear 361 to provide the torque for the above train.

It is to be understood that the parts and operation of the right factor set-up mechanism not specifically described are the same as those disclosed hereinbefore in connection with the left factor set-up mechanism.

Clearance mechanism

The factor selecting mechanism including the set-up carriages and the factor numeral wheels may be returned to their normalized positions at any time before or after the machine has performed any of the calculations described in said Avery patent application. Before considering the actual clearing mechanism, however, it should be noted that two links 440 and 445 (Fig. 8) are connected to the left and right factor arms 325 and 350, respectively, by two studs such as stud 442. In the other ends of these links are formed apertures, such as aperture 439 formed in link 440 as shown in Fig. 7. Since both links are substantially the same, only the left factor clearing mechanism will be described in detail. It should be noted further that a third link 460, see also Fig. 11, having a differently shaped aperture 465 (Fig. 8) should not be confused with the two links in question, since link 460 is associated with what is termed the "last digit" mechanism for clearing the last digit, as will be described hereinafter.

It will be recalled that during the set-up of the left factor, the arm 325 rocks clockwise step by step. If an eight digit multiplicand has been set up, the link 440 is pulled downwardly, as shown in Fig. 7, until a shoulder 443 assumes the position 443A just above a stud 436. If a lesser number of digits are set up, as for example a four digit multiplicand, the shoulder moves only half the distance between the solid line position designated 443 and the dotted line position 443A. The right factor link 445 (Figs. 8 and 11) is similarly moved in accordance with the number of multiplier digits set up and assumes a similar position relative to a corresponding stud 434 (Fig. 11).

From the foregoing then, it may be seen that by pulling links 440 and 445 upwardly, as viewed in Fig. 8, the arms 325 and 350 and the left and right factor set-up carriages, respectively, may be restored to their initial positions. This is accomplished by depression of a clear key 157 (Fig. 1) which first energizes either or both of two factor clearance conditioning solenoids, namely an LCC (left clearance conditioning) solenoid 447 and an RCC (right clearance conditioning) solenoid 448 (Fig. 8), which are adapted to move their respective links toward the right to a position where the shoulders 443 lie in the path of the studs 436 and 434 (Figs. 7 and 11). The clear key also effects engagement of a clear clutch which then pulls the studs upwardly in Figure 8, or rearwardly in the machine. Considering first the clearance conditioning mechanism, it will be noted that the solenoids 447 and 448 have long armature stems 451 and 452, respectively, carrying lugs 454 and 456, one of which is shown in Figure 7 lying in the lower end of the aperture of its respective link 440. The stems 451 and 452 are guided in a stationary bracket 461 and are maintained toward the left by springs 463 and 462, respectively.

The clear key 157, referred to above and shown in detail in Figure 22, is mounted for up and down movement on two studs 371 and 372 and is normally maintained in raised position by spring 373 tensioned between an ear 374 on the key stem and the stud 371. A latch 375 is freely pivoted on a shaft 376 and is urged toward the left by a spring 378. A lateral extension 377, formed on the latch, is normally blocked by ear 374 on the key stem, but when the key is depressed the ear 374 passes beneath the lateral extension 377 and allows the spring 378 to rock the latch 375 toward the left to lock the key in depressed position. An insulation tip 379, mounted on the latch 375, is moved downwardly and allows a switch 380 to close the circuit from the main line 382 (Fig. 13) through the LCC and RCC solenoids as follows. The heavy lines 382 and 384 represent the main line for supplying electro-motive force to the various control circuits of the machine disclosed in said Avery patent application and in this case when the switch 380 is closed, the main line is connected to the clearance control circuit including lead 385, the normally closed contacts 386, lead 388, through the LCC solenoid 447 to ground, and also from lead 385 through a parallel circuit including the normally closed contacts 387, lead 389, through RCC solenoid 448 to ground. Thus, immediately following depression of the clear key 157 and closure of the switch 380, the solenoids 447 and 448 are energized and pull the links 440 and 445 toward the right (Figs. 7 and 8).

The CC (clear clutch) solenoid 383 (Fig. 13) is also energized upon depression of the clear key 157 which closes either or both of the two parallel circuits described immediately hereinbefore, and therefore energizes either or both of the branch leads 390 and 391 which lead from said respective parallel circuits through the CC solenoid to ground. A link 392 (Fig. 18) connects the solenoid armature 393 to a clear clutch control dog 394 so that energization of the solenoid rocks the dog downwardly about the shaft 395 upon which it is freely pivoted, to first close the circuit to the electric motor and then engage the clear clutch 400. A lug 401, made of insulating material, is moved downwardly when the clutch dog 394 is rocked clockwise and allows the switch 402 to close the circuit from the main line 384 (Fig. 13) through the electric motor 405 to ground. The motor 405 (Fig. 2) carries a pinion 412 fixed to the motor shaft 413 and drives the gear 414 journaled on a stub shaft 415. A gear 416 (Fig. 19) is integral with gear 414 and meshes with an idler 417 which drives a gear 418 (Fig. 20). The latter gear is fixed to a clear clutch drive disc 411 forming an integral unit freely rotatable on a clutch shaft 410. The clear clutch is of the type disclosed in the Avery et al. Patent 2,162,238, dated June 13, 1939, to which reference may be had for details of the clutch not specifically described herein. Clockwise movement of the clutch dog 394 (Fig. 18) effects engagement of the clear clutch by releasing a clutch pawl 406 (Fig. 19). The clutch pawl is freely pivoted on a stud 419, carried by a clutch disc 407, and is urged counter-clockwise about this stud by a spring 422 so that when the pawl is released, it rocks into engagement with the notched clutch drive disc 411, thereby causing engagement of the clear clutch. The clutch disc 407 is integral with a hub 408 and a cam 409, all of which are freely rotatable on the shaft 410 and driven one revolution in a clockwise direction by the clutch driving disc 411 when the clutch is engaged.

A cam follower 424 (Fig. 18) is fixed to a shaft 425 and is rocked counter-clockwise by cam 409 during the latter part of the clear clutch cycle. A lever 426 is also fixed to the shaft and has a spring 427 which maintains the roller 423 against the cam and returns the shaft 425 to the position shown at the end of the cycle. A link 430 is connected to lever 426 and has three branch arms 431, 432, and 433 (Fig. 11), two rollers 466 and 467 being provided for guiding the link 430 and its branch arms. The arms 431 and 433 carry the two studs 434 and 436, respectively, referred to hereinbefore.

The arrangement is such that following depression of the clear key, the LCC and RCC solenoids (Fig. 3) first pull their respective links toward the right from the position shown in Figure 7, and then the clear clutch effects rightward movement of link 430, the studs 434 and 436 and links 440 and 445 (Fig. 11), which is upward as shown in Figs. 7 and 8. This rocks the carriage arms 325 and 350 counter-clockwise and shifts the carriages toward the left.

A stop lug 297 (Figs. 9 and 12) is mounted for up and down movement on a stud 468 (Fig. 8) on each carriage, and is guided by an ear 469 (Fig. 9) formed on the lug and extending through a slot in the carriage. A spring 471 is tensioned between ear 469 and an ear 472 on the carriage and normally maintains the lug in raised position shown in Fig. 9 but may yield so that if a stop lever 295 (Figs. 2 and 5) in any order is locked down before the carriage is completely returned, the diagonal surface (Fig. 9) will cam the lug down as it passes beneath the stop lever, after which it will snap up into blocking position.

It was explained hereinbefore that during the set up operation the arcuate plates 269 (Fig. 2) are slid clockwise relative to the shaft 270 so that the noses 277 thereof rock the latches 278 clockwise to release arms 280, and that the plates are held in the latter position by the pawls 274. These plates must be returned to the position shown during the clearance operation so that when the arms 280 are restored, the latches 278 will be in position to hold them in their initial positions. For this purpose carriages 240 and 245 each have an ear 473 (Figs. 2 and 5) formed diagonally toward the right of the machine to provide a camming surface which is adapted to engage the lugs 474 on the arcuate plates 269. The arrangement is such that as the carriages move leftwardly through the denominational orders of the right and left factor selecting mechanisms, the ears 473 successively engage the lugs 474 in each order and slide the plates 269 counter-clockwise where they are held by the pawls 274. The latches 278 are thus released so that springs 279 may rock them into position to latch the arms 280 when the latter are returned to the position shown during the clearance of the factor numeral wheels.

The ears 473 mentioned above extend toward the right a distance approximating half the distance between orders of the selecting mechanism, and it is therefore necessary to move both carriages an extra half step leftwardly beyond the leftmost order of their respective selecting mechanisms, so that the ears 473 may move the lugs and the plates 269 counter-clockwise in such leftmost or highest orders, as well as those in the lower orders as explained in the preceding paragraph. For this purpose, the slots 326 and 351 (Fig. 8) of the arms 325 and 350 are made longer than otherwise necessary to return the carriages to their first operative full step positions, and cam 409 (Fig. 18) is of such amplitude as to give the links and arms the overstroke for effecting this extra half step movement of the carriages.

This extra half step movement is utilized to render the set-up control mechanism effective to retain the right factor set up carriage in its extra half step or inoperative position, so that depression of the numeral keys for setting up the next problem will be effective to control the left factor set up carriage. During the extra half step movement of the left factor arm 325 (Fig. 17), the diagonal surface 355a first engages the nose of pawl 337 and rocks the latter counter-clockwise about stud 338 which moves the pawl 353 into engagement with the ratchet teeth 352 of the right factor arm 350, and then the abutment 355 engages the left end of pawl 337 and drives the assembly including pawl 353, stud 338 and bail 339 counter-clockwise about the center of shaft 330 to the position shown in Fig. 8, whereupon the latch 341, under urge of spring 549, rocks clockwise to the latching position shown. When the clear cam 409 and follower 424 returns to the position shown in Fig. 18 at the end of the clear clutch cycle, the arms 325 and 350 (Fig. 8) are released and are urged toward the right of the machine by their spring urged cables 291 and 343 described hereinbefore. The arm 350 is held in its extra half step position shown, however, by the pawl 353 which blocks the first tooth 352, thereby disabling the right factor carriage, whereas the pawl 337 is held away from the ratchet teeth of arm 325 by the latch 341 as shown, and permits the spring urged cable 291 to move the left factor carriage toward the right until it is blocked in its first full step operative position by the first stop lever 295.

*Clearance of the factor numeral wheels*

Concurrently with the return of the set-up carriages and related mechanisms described above, the factor numeral wheels are returned to their initial "blank" positions. The shaft 425 (Fig. 18), which drives the carriage return mechanism, is coupled to a coaxial shaft 475 (Fig. 21), both of which are journaled in a bearing 476. The coupling includes a tongue 477 on shaft 425 which is situated within a slot 478 in the shaft 475 so that counter-clockwise movement of the shaft 425 rocks the shaft 475 the same amount.

An arm 480 (Fig. 18) is fixed to shaft 475, and has a gear segment 481 which drives the pinion 482 secured to the shaft 270. This latter shaft has a plurality of arms 483 (Fig. 2) fixed thereto, one in each denominational order of the right factor set-up mechanism. A stud 484 is mounted on each segment 358 and lies in the path of a stud 485 mounted on each arm 483. The arrangement is such that during the set-up operation, described hereinbefore the studs 484 move counter-clockwise varying amounts depending upon the numerals set up in the different orders of the factor indicator, the maximum movement being somewhat less than 180° from the position shown in Fig. 2, and during the clearance operation the studs 485 are rotated clockwise from the position shown through an angle somewhat less than 360°, by operation of the clear clutch, and in so doing pick up the studs 484 and carry the segments 358 to and slightly beyond the position shown in Fig. 2. As shown in Fig. 18, the cam 409 releases the cam follower 424 at the end of the clutch cycle, whereupon spring 427 returns the lever 426 and shaft 425 to the position shown, and a spring 487 urges the arm 480 upwardly and rotates shaft 270 counter-clockwise and arms 483 (Fig. 2) back to the position shown.

The clearance of the left factor selection mechanism is accomplished in substantially the same way as that described above, the only difference being that the studs 485 are mounted on discs 852 (Fig. 12) one of which is keyed to shaft 270 in each order of the left factor indicator for use in partial product mechanism described in the aforementioned Avery patent application; and that the studs 484 which coact with the studs 485 are mounted on their respective discs 851, one of which is mounted on the arm 280 and segment 281 in each order of the left factor indicator. Therefore, when the shaft 270 is rocked by the clear clutch mechanism as described above, the arms 280 of the left factor indicator are restored to their initial positions at the same time the right factor arms are restored.

The restoration of the arms 280 and their respective segments 281 and 358, as above described, serves to rotate the factor numeral wheels 357 and 285 (Fig. 2) backwardly to their blank position by means of the gear train explained hereinbefore, thus tensioning the torsion springs 362 and 286. When the arms 280 reach the position shown in Fig. 2, they are locked by the latches 278 in each order, thus storing in the springs 362 and 286 the power derived from the motor, for use in driving the numeral wheels and the selection train during the set up of the next problem. During the restoration of arms 280, the lateral extensions 280a (Fig. 7) engage the camming surfaces 486 and rock the stop levers 295 counter-clockwise into the blocking positions shown, where they remain until the arms 280 are again released during the set up of the next problem.

The blocking levers 258, which are set in blocking position by depression of the numeral keys during the set-up operation, are also restored to the normal positions shown in Fig. 2 during the clearing operation. When the arcuate plates 269 are slid counter-clockwise, by the ears 473 described hereinbefore as forming a part of each of the two set-up carriages, the lugs 271 contact the ears 268 of the levers 258 which were previously set and rock the latter to the normal positions shown, where they remain until the numeral keys are again depressed during the set up of the next problem.

Means are provided to limit the clear clutch to one cycle irrespective of the length of time the clear key is held down. When the clear key 157 (Fig. 22) is depressed and spring 378 rocks latch 375 counter-clockwise, as described hereinbefore, the lower edge of latch 375 engages an ear 488 on a lever 489, thereby rocking the lever counter-clockwise, latch 375 being free on the shaft 376 and lever 489 fixed on the shaft. A member 490 (Fig. 21) is also fixed on the same shaft 376 and overlies an ear 491 of a latch 492, freely mounted on the shaft, so that counter-clockwise rocking of shaft 376 rocks a shoulder 493 of latch 492 downwardly to free a lug 494 on a link 495. An arm 497 is fixed to the shaft 475 and is moved toward the right when the shaft is rocked by cam 409 (Fig. 18). A lever 498 (Fig. 21) freely pivoted on a stud 499 and connected to link 495 is thus released by arm 497 to allow a spring 496 to pull the link 495 toward the left and rock the lever 498 clockwise. Link 495 has a shoulder 501 which drops in front of an ear 502 formed on the member 490. When the cam 409 (Fig. 18) returns to the position shown and the roller 423 rides down the slope of the cam, thereby allowing shaft 475 (Fig. 21) to rock clockwise, the arm 497 engages the stud 503, rocking lever 498 counter-clockwise and pulling the link 495 toward the right. In so doing the hook 501 rocks the member 490 and shaft 376 clockwise. The member 490 and shaft 376 are moved through a considerable overstroke so as to rock the latch 375 (Fig. 22) clockwise to a position where it is locked by the shoulder of a second latch member 504. This opens the switch 380 and the circuit to the clear clutch solenoid and holds the switch open even though the operator holds the key down. The solenoid 383 (Fig. 18) is thus deenergized slightly before the clear clutch reaches the full cycle position shown, whereupon the spring 505 moves the clutch dog 394 upwardly into the notch in the clutch disc so as to disengage the clutch. At any time either during or after the foregoing operation, the operator could release the clear key, but it would not in any event be able to rise until the ear 374 (Fig. 22) had been released by latch 375, as above described. As soon as the key is released both by the operator and by latch 375, it will rise, and in rising the ear 374 will engage the latch 504 and raise it clear of the key latch 375, so that the latter latch will be free to again come into operation, but by the time the key has risen sufficiently to thus release latch 375 the ear 374 will have moved up opposite the ear 377, thereby preventing the latch from rocking counter-clockwise and closing the switch until the key is again depressed.

When the foregoing operations have been completed the ear 502 (Fig. 21) must be free from the restraint of hook 501 so the shaft 376 and latch 375 (Fig. 22) may return to the position shown when the key is released, and thus be ready to properly function when the clear key is again depressed. For this purpose, a stud 506 is mounted on the member 490 and moves upwardly when the member is rocked clockwise by the hook 501. Slightly before the end of the stroke of link 495, the stud 506 engages the lower surface thereof and rocks the hook 501 upwardly to disengage the ear 502 and allow the shaft 376 and the latch 375 to return to the position shown. A spring 507 is tensioned between the stud 506 and ear 491 and urges lever 492 upwardly so that when the lug 494 moves in back of the shoulder 493, the shoulder may snap up and prevent the spring 496 from pulling the link toward the left until a clearance control key is again depressed.

*Factor clearance disabling mechanism*

In some types of calculations it is advantageous to be able to retain one factor in the machine for a series of calculations, while permitting clearance of the other factor preparatory to entry of different values for the other factor; therefore, the present invention includes left and right factor lock keys 160 and 161 (Figs. 1 and 13) which are provided in the machine fully disclosed in the Avery application Serial Number 506,519 of which this is a division. These keys are adapted to be latched down when depressed so that depression of the main clear key 157 will be effective to clear all the numeral wheels, except those of the factor indicator corresponding to the lock key depressed. The lock keys may be released by their respective "R" (release) keys, fully described in said Avery application, which keys are so arranged that partial depression thereof only release their respective lock keys while the complete depression both releases the lock keys and effects clearance of the respective factor indicators.

As described hereinbefore under the heading "Clearance mechanism," the links 440 and 445 (Figs. 7, 8, and 11) are normally in the disabled positions shown in Fig. 7. Depression of the clear key 157 (Fig. 13) when neither of the keys 160 or 161 is depressed, causes energization of the LCC and RCC solenoids by way of the circuits described hereinbefore. These solenoids pull their respective links 440 and 445 towards the right to position the shoulder 443 on each link in the path of a respective stud 436, thereby enabling the clear clutch to pull both links and restore both left and right factor set-up carriages and their arms 325 and 350 (Fig. 8). If the right factor lock key 161 were depressed, for example, so as to retain the multiplier value in the machine while the left factor is cleared, this key 161 opens the contacts 387 (Fig. 13) in the circuit through the RCC solenoid and thus prevents energization of that solenoid and consequently prevents the rightward movement of link 445 (Fig. 7) connected to the right factor carriage arm 350 (Fig. 8). During the operation of the clear clutch the left factor arm 325 will be restored as described hereinbefore, but the arm 350 being disconnected from the clear clutch by the link 445 will not be restored.

As further described hereinbefore, the carriage control mechanism is in the condition shown in Fig. 17 during or after the multiplier is set up. In this condition, the latch 337 holds the left factor carriage in a disabled half step position, and the latch 353 has released the right factor carriage for movement into an operative full step position, wherein it is subject to control by the numeral keys. The carriages remain in these same conditions when the multiplication calculation is completed.

With the right factor clearance mechanism disabled by the lock key 161 and related mechanism described above, the left factor arm 325 is restored to normal position upon depression of the clear key. During this restoration the camming surface 355a also described hereinbefore, first cams pawl 337 out, and pawl 353 into engagement with the one of the ratchet teeth 352 which is immediately above it. During the extra half step movement of arm 325, the abutment 355 engages the end of pawl 337 and forces it and pawl 353 upwardly and toward the right, thus rocking the right factor carriage 350 a half step back to a disabled half step position, whereupon latch 341 springs into the position shown in Fig. 16 and retains the pawls 337 and 353 in the positions shown in Figs. 8 and 16. Under these conditions the latch 337 is free of the teeth 336 to permit movement of arm 325 to its first full step position shown in Fig. 8 and consequently in condition to be set by the keyboard, while the pawl 353 remains in a position to block one of the teeth 352 and the right factor carriage in a half step position, so the latter will not be set by the keyboard. Since the right factor carriage is not restored under these conditions, the right factor is retained in the right factor indicator while the left factor is cleared by the mechanism described hereinbefore.

A converse operation will result from the depression of the left factor lock key 160, whereupon depression of the clear key will cause clearance of the right factor while preventing clearance of the left factor in a manner described in detail in the above mentioned Avery application.

*Last digit clearing mechanism*

If the operator makes an error in setting up either factor and wishes to clear either the last one or several of the last digits set up without clearing the entire factor, he may depress the "Last digit" key 154 (Fig. 1), i. e., if he wishes to clear the last digit only he depresses the key and releases it immediately, and if he wishes to clear more than one, he simply holds the key depressed for the period of time required for the machine to clear the two, three, or four digits as the case may be. The arrangement is also such that depression of the "Last digit" key clears the last digit or digits from the factor indicator which is being set up at the time the key is depressed.

The "Last digit" key 154 (Fig. 23) is mounted for up and down movement on studs 523 and 524 and is normally maintained in raised position by a spring 526. An insulating tip 527 is mounted on the key stem and is adapted, upon depression of the key, to close the contacts 528 of the switch 530. These contacts being normally connected to the main line 382 (Fig. 13) through the normally closed contacts 987, close the circuit through the "CC" solenoid to ground. As explained in connection with the factor clearing mechanism, this solenoid (Fig. 18) effects engagement of the clear clutch 499, and causes the link 439 to be pulled toward the rear of the machine by operation of the clear clutch cam 409. The principal difference between the clearing operation and the "last digit" operation is that the LCC and RCC solenoids (Fig. 13) are not energized during the "last digit" operation and the studs 434 and 436 (Figs. 7 and 11) do not engage shoulders 443 (Fig. 7), but instead move into the grooves 531 without actuating the clearing links 440 and 445. The last digit link 460, however, is held toward the left in the position shown in Fig. 8 by a spring 464, to bring the shoulder 532 into the path of stud 435 so that rearward movement of the latter pulls the link 460 rearwardly. The forward end of this link is connected to a lever 535 pivoted to the frame of the machine at 536 and urged counter-clockwise by a spring 537. Two pawls 538 and 539 (Figs. 15 and 17) pivotally mounted on lever 535 are urged clockwise by springs 541 and 542 and limited in that direction by an ear 543 formed on lever 535.

Figure 15:
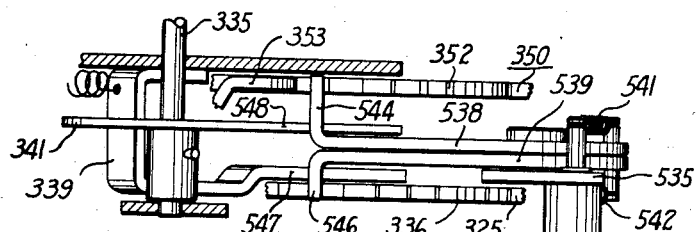

These two pawls are adapted to step their respective arms 325 and 350 and the left factor and right factor set-up carriages back one step plus a half step overstroke for reasons explained hereinbefore, the pawls being automatically enabled or disabled by the set-up mechanism so that the one associated with the factor indicator being set up is rendered effective and the other ineffective to back step its respective carriage, as follows. The pawls 538 and 539 (Figs. 15 and 17) are formed at right angles, providing lugs 544 and 546, which are adapted to engage the teeth 352 and 336 of the carriage arms 350 and 325, respectively. The latch 337 has an arm 547 (Fig. 10) also shown in Fig. 15, which lies across the plane of the lug 546, and latch 341 has a similar arm 548 which lies across the plane of the lug 544 (Fig. 15). When the left factor indicator is being set up, the parts assume the position shown in Fig. 16, where it can be seen that latch 337 is held counter-clockwise by latch 341, as explained hereinbefore. The arm 547 is thus held away from the lug 546 so that when link 460 is actuated, the lug 546 moves upwardly on an arc about stud 536 and engages a tooth of the left factor carriage arm 325 to step the arm and the left factor carriage back one step. When the latch 341, shaft 335, and lever 342 (Fig. 3) are held in their extreme clockwise position by spring 549, an arm 543 (Fig. 16) integral with latch 341, holds ear 544 away from the teeth 352 so that when the lever 535 is rocked, the ear 544 slides upwardly along the curved surface of arm 548 without engaging the teeth of the right factor arm 350.

When the right factor is being set up, the reverse condition prevails, namely, the left factor pawl 539 (Fig. 17) is disabled by arm 547 of latch 337 having been rocked toward the right as previously described. The right factor pawl 538, at this time, is enabled by arm 548 having been moved toward the left by depression of the "X" or "Neg. X" key as explained hereinbefore.

If the "Last digit" key is held down the clear clutch continues to cycle and the cam 409 reciprocates link 460 (Fig. 16) to back step the carriage as many steps as desired depending upon how long the operator holds the key down.

Operation of the clear clutch and rotation of cam 409 (Fig. 18) during the "last digit" operation serves to perform two coordinated functions: (1) to rock shafts 425 and 475 (Fig. 20) and the arm 489 counter-clockwise and back again, to thereby return the segments 261 and 358 (Fig. 2) and their respective numeral wheels to their normalized position shown and then to release them for movement to their previously set position, as previously described; (2) to back step the carriage associated with the factor indicator currently being set up, also as previously described, so as to cause the numeral wheel which was last set up to be retained in its normalized or clear position. Assuming, as an example, that the right factor indicator is currently being set up, the arrangement is such that prior to the "last digit" operation, the ear 473 (Fig. 2) of the right factor carriage 240 stands approximately one-half step to the right of the next unset order, or one and one-half steps to the right of the order last set up. The amount of the (leftward) back step movement necessary for the carriage to accomplish its required function therefore, in approximately equal to or slightly greater than one and one-half ordinal steps. During the first half step movement thereof the ear 473 moves ineffectively past the lug 474 in the above mentioned next unset order, but during the next full step, the ear 473 engages the lug 474 in the next order to the left (the order last set up) and causes counter-clockwise rocking of the arcuate plate 269 in that order. This rocking of the arcuate plate does two things: (1) it rocks the previously set selecting lever 258 counter-clockwise to its normalized position shown; (2) it releases the latch 278 which is then free to rock into latching position under urge of spring 279 as described hereinbefore. By means of the coaction of the above mechanism, the latch 278 in the order last set up only, is enabled to retain its associated arm 288 and numeral wheel 357 in their normalized position shown, whereas the latches in all the other previously set orders are held out of latching position so that when the clear cam 409 (Fig. 18) returns to its full cycle position shown, the parts including the numeral wheels and arms 288 (Fig. 2) in all the other orders return to their previously set position.

The lateral extension 289a of the arm 289 in the order last set up also rocks the carriage stop lever 295 counter-clockwise in that order, so that when the clear cam returns to its full cycle position and releases the carriage 240 for rightward movement under urge of spring 344, the carriage is permitted to move only a half step rightwardly, after which it is blocked by the stop lever 295 in the order from which the "last digit" was just cleared. This rightward half step movement of the carriage moves the ear 473 out of the plane of the lug 474 to permit subsequent rocking of the plate 269, and also moves the levers 257 into alignment with the ears 268 of lever 258 so that a new digit may be set up in the order from which said "last digit" was just cleared.

The "Last digit" key is latched down for the greater part of the clear clutch cycle, for various reasons disclosed in the aforementioned Avery patent application in connection with the calculating mechanism, and is released and permitted to rise near the end of the first and each successive clear clutch cycle. When the LD key is depressed to close the contacts 528 (Fig. 23) and thereby cause engagement of the clear clutch as described hereinbefore an ear 522 on the key stem moves down and beneath a hook on a latch 525. This latch is freely pivoted on shaft 376 and is urged counter-clockwise by a spring 529 so that when the key is depressed the latch snaps over the top of ear 522 to hold the key depressed until automatically released by the following mechanism. An arm 519, also formed on the key stem is effective upon depression of the LD key to rock lever 492 downwardly, which as described in connection with the operation of the "C" (clear) key, removes the shoulder 493 (Fig. 21) from in front of the lug 494 so that during the clear clutch cycle the shoulder 501 may move toward the left and drop in front of the ear 502 and then return to the right, thereby rocking member 499 and shaft 376 clockwise. This shaft has a lever 566 (Fig. 23) fixed thereto, which lever has an ear 567 formed across the plane of latch 525, so that clockwise rocking of shaft 376, rocks the latch toward the right from above the ear 522 to release the key. If the operator has also released the key by this time, it will then rise under urge of spring 526, but if the operator should hold the key down, the contacts 528 will be held closed and another clear clutch cycle will follow to clear the next to last digit set up, after which the above described mechanism will again operate to release the key. If the operator then releases the key it will rise and permit the contacts 528 to open and enable the clear clutch to disengage at the end of its current cycle.

Mechanisms disclosed but not claimed herein are claimed in the application Serial No. 506,519, filed October 16, 1943, of which this a division.

I claim:

1. In a calculating machine having a multi-order first factor receiving device, a multiorder second factor receiving device, selecting mechanism, and an operation control member; the combination of, means for transmitting movements representative of different numeral values from said selecting mechanism to said first factor receiving device including an ordinally shiftable set-up carriage, shifting means operable under control of said selecting mechanism to shift said carriage into operative relationship with successive orders of the first factor receiving device, means for transmitting movement representative of different numeral values from said selecting mechanism to said second factor receiving device including a second ordinally shiftable set-up carriage, and a second shifting means operable under control of said selecting mechanism for shifting the second set-up carriage into operative relationship with successive orders of the second factor receiving device, with shift disabling mechanism normally effective to disable the second shifting means and hold the second set-up carriage out of operative relationship with the second factor receiving device, and shift control means responsive to actuation of said control member for causing said first shifting means to shift the first carriage out of operative relationship with the first receiving device and concurrently rendering said shift disabling mechanism ineffective.

2. In a calculating machine having a multi-order factor receiving device including ordinal control members settable to control entry of factor digits into successive orders of the receiving device, and selecting mechanism including a plurality of numeral keys; the combination of, an ordinally shiftable set-up carriage, factor setting elements mounted in the carriage and operable under control of the numeral keys to set successive ordinal control members in accordance with the key depressed, and shifting mechanism also operable under control of the numeral keys to shift the carriage through successive ordinal steps and thereby move the setting elements out of and into setting relation with successive orders of the control members, with an operation control key, and means operable under control of said key to suspend operation of the ordinal shifting mechanism and to concurrently move the setting elements out of setting relation with the ordinal control members.

3. In a calculating machine having a multi-order factor receiving device including ordinal control members settable to control entry of factor digits into respective orders of the receiving device, an ordinally shiftable set-up carriage, and factor setting elements mounted in the carriage and each normally positioned thereby in ordinal setting relation with successive ordinal control members; the combination of, means including a plurality of numeral keys each operable to actuate a respective setting element and to cause the same to set the corresponding control member with which the element is positioned in setting relation, and an operation control key, with means selectively responsive to said numeral keys or to said control key for moving the setting elements out of setting relation with said corresponding control members, and means operable only in response to said control key to prevent movement of the setting elements into setting relation with said ordinal control members.

4. In a calculating machine having a factor numeral indicator, ordinal numeral wheels therefor, a factor set up carriage shiftable into a plurality of ordinal positions in each of which it is operative to selectively control a corresponding one of said numeral wheels, said carriage also having a plurality of ineffective positions in each of which it is incapable of controlling any of said numeral wheels, a second factor numeral indicator, ordinal numeral wheels therefor, a second factor set up carriage shiftable into a plurality of ordinal positions in each of which it is operative to selectively control a corresponding one of the numeral wheels of said second factor indicator, said second factor carriage having a plurality of ineffective positions in each of which it is incapable of controlling any of said numeral wheels; the combination of, selecting mechanism operable to cause said first and second factor set up carriages to selectively control their respective numeral wheels and to shift ordinally relative thereto, with carriage control means operable to maintain said second set up carriage in an ineffective position and to enable said first set up carriage to shift into any one of said plurality of ordinal positions, and manually operable means to cause said carriage control means to maintain said first set up carriage in an ineffective position and to enable said second set up carriage to shift into one of its ordinal positions.

5. In a calculating machine having a factor numeral indicator, ordinal numeral wheels therefor, a factor set up carriage shiftable from an initial position into a plurality of ordinal positions in each of which it is operative to control a corresponding one of said numeral wheels, said carriage also having a plurality of ineffective positions in each of which it is incapable of controlling any of said numeral wheels, a second factor numeral indicator, ordinal numeral wheels therefor, a second factor set up carriage shiftable from an initial position into a plurality of ordinal positions in each of which it is operative to control a corresponding one of the numeral wheels of said second factor indicator, said second factor carriage having a plurality of ineffective positions in each of which it is incapable of controlling any of said numeral wheels; the combination of, carriage control means operable to maintain said second factor set up carriage in its initial position and to enable said first factor set up carriage to shift as aforesaid, numeral keys and key mechanisms therefor corresponding respectively to digital values zero to nine, inclusive, and operable to cause said first carriage to set one of said first factor numeral wheels according to the value of a numeral key depressed, and shift means operable under control of said numeral key mechanism to shift said carriage into the next one of said ordinal positions, with conditioning mechanism including, an operation control member, means responsive to actuation of said control member for operating said zero key mechanism to cause said first factor set up carriage to shift, means also responsive to actuation of said control member to cause said carriage control means to stop said first set up carriage in an ineffective position and to concurrently enable said second factor set up carriage to shift out of said initial position and into an ordinal operative position.

6. In a calculating machine having a factor numeral indicator, including ordinal numeral wheels, a set up carriage having a plurality of ordinal positions in which it is operative to control said numeral wheels, said carriage also having a plurality of ineffective positions in which it is incapable of controlling any of said numeral wheels; the combination of, numeral keys corresponding to the digital values zero to nine, key mechanism controlled thereby for causing said set up carriage to set any one of said numeral wheels according to the value of the numeral key depressed, and shift means controlled by said keys for shifting said carriage to an adjacent ordinal position; with, set up disabling mechanism including means operable thereby to actuate the zero key mechanism, said disabling mechanism also including means operable to stop said carriage in one of said ineffective positions.

7. In a calculating machine having a factor numeral indicator including ordinal numeral wheels, a set up carriage having a plurality of ordinal positions in which it is operative to control said numeral wheels, said carriage also having a plurality of ineffective positions in which it is incapable of controlling any of said numeral wheels; the combination of, numeral keys corresponding to the digital values zero to nine, selection mechanism controlled thereby for causing said set up carriage to set an associated one of said numeral wheels according to the value of the numeral key depressed, and shift means controlled by said keys for shifting said carriage to an adjacent ordinal position, with, a control key operable in any selected sequence relative to the depressions of said numeral keys, and mechanism operable in response to operation of said control key for disabling said selection mechanism and said shift means and for concomitantly locating said carriage in one of said ineffective positions.

8. In a calculating machine having a factor numeral indicator including ordinal numeral wheels, a set up carriage having a plurality of ordinal positions in which it is operative to control said numeral wheels, said carriage also having a plurality of ineffective positions in which it is incapable of controlling any of said numeral wheels; the combination of, numeral keys corresponding to the digital values zero to nine, key mechanism controlled thereby for causing said set up carriage to set an associated one of said numeral wheels according to the value of the numeral key depressed, and shift means controlled by said keys for shifting said carriage to an adjacent ordinal position, with, set up disabling mechanism including, a device selectively operable to initiate operation of said shift means, and means operable as an incident to operation of said device to stop said carriage in one of said ineffective positions.

9. In a calculating machine having a first factor indicator including ordinal numeral wheels settable to positions indicative of different numeral values, means including a factor set up carriage normally operable to set one of said numeral wheels at a time, a second factor indicator including ordinal numeral wheels settable to positions indicative of different digital values, means including a second factor set up carriage normally operable to set the numeral wheel of said second factor indicator one at a time, set up control mechanism for rendering one of said set up carriages currently effective and the other ineffective to set their respective numeral wheels; the combination of, normalizing mechanism operable to zeroize the numeral wheels of said first or second factor indicator, with means controlled by said set up control mechanism for rendering said normalizing mechanism effective to zeroize the numeral wheels of that factor indicator only which are set by the currently effective set up carriage and for rendering said normalizing mechanism ineffective to zeroize the numeral wheels of the other factor indicator.

10. In a calculating machine having a first factor indicator including ordinal numeral wheels settable to positions indicative of different numeral values, a factor set up carriage shiftable forwardly into operative relation with successively adjacent numeral wheels, said carriage being operable to control the numeral wheel with which it is operatively related, a second factor indicator including ordinal numeral wheels settable to positions indicative of different numeral values, and a second factor set up carriage shiftable forwardly into operative relation with successively adjacent numeral wheels of said second factor indicator, said second carriage being operable to control the numeral wheel with which it is operatively related; the combination of, set up control mechanism for rendering one of said set up carriages currently effective and the other ineffective to set their respective numeral wheels, said set up control mechanism being operable to enable the currently effective carriage to shift and to prevent the current ineffective carriage from shifting, normalizing mechanism operable to zeroize a numeral wheel of said first or second factor indicator, means controlled by said set up control mechanism for rendering said normalizing mechanism effective with regard to that factor indicator only which is set by the currently effective set up carriage and for rendering said normalizing mechanism ineffective with regard to the other factor indicator; with means also controlled by said set up control mechanism and actuated by the normalizing mechanism to shift the currently effective set up carriage backwardly.

11. In a calculating machine having a first factor receiving device including ordinal selection elements each settable to correspond to a digit of a first factor, means including a first set up carriage shiftable forwardly from an initial position into a plurality of ordinal positions in which it is effective to control the setting of respective ones of said selection elements, a second factor receiving device including ordinal selection elements each settable to correspond to a digit of a second factor, means including a second set up carriage shiftable into a plurality of ordinal positions in which it is effective to control the setting of respective ones of the selection elements of the second factor receiving device; the combination of, normalizing mechanism including means for zeroizing the first factor receiving device, with, restoring means operable under control of said normalizing mechanism to shift said first carriage reversely to its initial position, and disabling means operable under control of said restoring means to disable said second carriage.

12. In a calculating machine having a first factor receiving device including ordinal selection elements each settable to correspond to a digit of a first factor, means including a first factor set up carriage shiftable into a plurality of ordinal positions in which it is effective to control the setting of respective ones of said selection elements, a second factor receiving device including ordinal selection elements each settable to correspond to a digit of a second factor, means including a second set up carriage shiftable from an ineffective position into an effective position in which it is operative to control the setting of a respective one of the selection elements of the second factor receiving device; the combination of, normalizing mechanism operable to zeroize the first and second factor receiving devices, means for initiating operation of said mechanism, carriage restoring means including, a first member and a second member operable under control of said initiating means, means operable by said first member to shift said first carriage to said initial position, and means operable by said second member to shift said second set up carriage to ineffective position, with, means for retaining said second carriage in said ineffective position, and means responsive to operation of said first member to render said retaining means effective.

13. In a calculating machine having a first factor indicator including ordinal numeral wheels, a first factor set up carriage shiftable forwardly from an initial position into a plurality of ordinal positions in which it is effective to control respective ones of said numeral wheels, a second factor indicator including ordinal numeral wheels, a second factor set up carriage shiftable forwardly from an initial position into a plurality of ordinal positions in which it is effective to control respective ones of said second factor numeral wheels; the combination of, normalizing mechanism including means for zeroizing said first and second factor numeral wheels, and means for initiating operation of said mechanism, with, carriage restoring means including, a first member and a second member operable under control of said initiating means, means operable by said first member to shift said first factor set up carriage reversely to its initial position, means operable by said second member to shift said second factor set up carriage reversely to its initial position, and means operable under control of said first member to disable said second factor set up carriage.

14. In a calculating machine having a first factor indicator including ordinal numeral wheels, a first factor set up carriage shiftable forwardly from an initial position into a plurality of ordinal positions in which it is effective to control respective ones of said numeral wheels, a second factor indicator including ordinal numeral wheels, a second factor set-up carriage shiftable forwardly from an initial ineffective position into a plurality of ordinal positions in which it is effective to control respective ones of said second factor numeral wheels; the combination of, normalizing mechanism including means for zeroizing said first and second factor numeral wheels, and means for initiating operation of said mechanism, with, carriage restoring means including, a first member and a second member operable under control of said initiating means, means operable by said first member to shift said first factor set-up carriage reversely to its initial position, means operable by said second member to shift said second factor set-up carriage reversely to its initial inoperative position, means for retaining said first factor set-up carriage in its initial position, and means operable under control of said first member to retain said second factor set-up carriage in its initial ineffective position.

15. In a calculating machine having a factor indicator including ordinal numeral wheels, ordinal selecting mechanism therefor including, spring means for moving a respective numeral wheel forwardly from an initial position to a plurality of positions indicative of different numeral values, restraining means for preventing movement of said numeral wheels by said spring means, means operable to release said restraining means, and means operable to limit the movement of said numeral wheels to a selected one of said positions; the combination of, numeral keys and means operable thereby to control said selecting mechanism, a set-up carriage shiftable into a plurality of ordinal positions for operatively associating said numeral keys with different orders of said selecting mechanism, and shift means operable under control of said numeral keys to shift said set-up carriage forwardly from one ordinal position to another; with, last digit mechanism for zeroizing the last numeral wheel set up including, means operable to cause all said numeral wheels to move backwardly to their initial positions against said spring means and then to permit said spring means to move said numeral wheels forwardly to their previously set positions, means for shifting said set-up carriage backwardly one ordinal position, and means operable by said set-up carriage upon such backward movement thereof to enable said restraining means to retain said last numeral wheel only in its initial position.

16. In a calculating machine having a factor indicator including ordinal numeral wheels, ordinal selecting mechanism therefor including, spring means for moving a respective numeral wheel forwardly from an initial position to a plurality of positions indicative of different numeral values, restraining means for preventing movement of said numeral wheels by said spring means, means operable to release said restraining means, and means operable to limit the movement of said numeral wheels to a selected one of said positions; the combination of, numeral keys and means operable thereby to control said selecting mechanism, a set-up carriage shiftable into a plurality of ordinal positions for operatively associating said numeral keys with different orders of said selecting mechanism, and shift means operable under control of said numeral keys to shift said set-up carriage forwardly from one ordinal position to another; with, last digit mechanism for successively zeroizing the last one or more numeral wheels set up including, a member manually adjustable to operation controlling position, and means responsive to adjustment of said member to cause all said numeral wheels to move backwardly to their initial positions against said spring means and then to permit said spring means to move said numeral wheels forwardly to their previously set positions, means responsive to adjustment of said member to shift said set-up carriage backwardly a selected number of ordinal positions corresponding to the period of time said member is held in operation controlling position, and means operable by said set-up carriage upon such backward movement thereof to enable said restraining means to retain in initial position the numeral wheels in those orders through which said carriage was moved during such backward movement.

HAROLD T. AVERY.

REFERENCES CITED

The following references are of record in the file of this patent:

UNITED STATES PATENTS

| Number | Name | Date |
|---|---|---|
| 1,253,310 | Von Reppert | Jan. 15, 1918 |
| 1,326,428 | Trimble et al. | Dec. 30, 1919 |
| 1,932,220 | Kottmann | Oct. 24, 1933 |
| 2,250,837 | Muller | July 29, 1941 |
| 2,343,273 | Avery | Mar. 7, 1944 |
| 2,365,527 | Dennis | Dec. 19, 1944 |

FOREIGN PATENTS

| Number | Country | Date |
|---|---|---|
| 497,196 | Great Britain | Dec. 14, 1938 |